United States Patent [19]

Bier et al.

[11] 4,115,371

[45] Sep. 19, 1978

[54] STABILIZATION OF POLYCONDENSATES OF POLYETHYLENE TEREPHTHALATE

[75] Inventors: Peter Bier; Rudolf Binsack, both of Krefeld, Germany

[73] Assignee: Bayer Aktiengesellschaft, Leverkusen, Germany

[21] Appl. No.: 802,858

[22] Filed: Jun. 2, 1977

[30] Foreign Application Priority Data

Jun. 15, 1976 [DE] Fed. Rep. of Germany ....... 2626827

[51] Int. Cl.$^2$ .................. C08G 63/34; C08G 63/32
[52] U.S. Cl. .......................... 528/279; 260/45.7 P; 528/275; 528/286; 528/309
[58] Field of Search .................. 260/75 R, 45.7 P

[56] References Cited

U.S. PATENT DOCUMENTS

| 2,822,348 | 2/1958 | Haslam | 260/75 R |
|---|---|---|---|
| 2,938,015 | 5/1960 | Gormley | 260/75 R |
| 3,028,366 | 4/1962 | Engle et al. | 260/75 R |
| 3,036,043 | 5/1962 | Gruschke et al. | 260/75 R |
| 3,047,515 | 7/1962 | Piirma | 260/75 R X |

*Primary Examiner*—Lucille M. Phynes
*Attorney, Agent, or Firm*—Gene Harsh; Lawrence S. Pope

[57] ABSTRACT

A process for the production of high molecular weight low color polyethylene terephthalates using a particulaarly effective polycondensation catalyst is disclosed. Titanium tetrabutylate is added to the reaction mixture after the initial esterification or transesterification reaction is about 95% complete and the polycondensation is completed at temperatures between about 200 and 270° C under reduced pressure. Metaphosphoric acid or its alkali or alkaline earth metal salts are added with the titanium tertrabutylate to control the color. Commonly accepted catalysts may be employed for the initial esterification or transesterification. Polymers with intrinsic viscosities in excess of 0.7 dl/g and yellowness numbers less than 6 can be produced.

16 Claims, No Drawings

STABILIZATION OF POLYCONDENSATES OF POLYETHYLENE TEREPHTHALATE

FIELD OF THE INVENTION

The present invention relates to a process for stabilizing polyethylene terephthalates against thermal decomposition and a process for the preparation of high molecular weight, light colored polyethylene terephthalates in the presence of stabilizers.

BACKGROUND OF THE INVENTION

As a rule, polyethylene terephthalates are prepared by esterifying the dicarboxylic acids, preferably pure terephthalic acid, and/or transesterifying the corresponding dimethyl esters with from 1.05 to 5, and preferably from 1.8 to 3.6 mols of the diols, relative to 1 mol of the dicarboxylic acid component, in the presence of esterification catalysts and/or reaction catalysts respectively at between 150° and 250° C. (reaction step A) and subjecting the reaction products thus obtained to polycondensation in the presence of esterification catalysts at between 200 and 300° C. under reduced pressure, preferably < 1 mm Hg (reaction step B).

Catalysts thus play a central role in the preparation of polyesters. They not only have a considerable influence on the reaction rate of the transesterification reactions but also influence side reactions and the heat stability and the color of the polyethylene terephthalates. Virtually all the metals, in the form of very diverse compounds thereof, have already been used as transesterfication catalysts and polycondensation catalysts (R. E. Wilfang in Polym. Sci. 54, 385 (1961)).

Among the many known polycondensation catalysts for reaction step B, compounds of germanium, antimony and titanium are preferably used, separately or in combination. For example, U.S. Patent Specification No. 2,578,660 describes the use of germanium and germanium dioxide. Germanium compounds do indeed give polyesters with an excellent degree of whiteness but they have only an average catalytic activity.

The use of antimony compounds (in combination with phosphorus compounds as stabilizers) is known, for example from U.S. Patent Specification No. 3,441,540 and from East German Patent Specification Nos. 30,903 and 45,278.

Titanium compounds, inter alia titanium tetraisopropylate or titanium tetrabutylate, are described, as catalysts for the preparation of fiber-forming polyesters, in, for example, British Patent Specification Nos. 775,316, 777,216, 793,222 and 852,061, U.S. Patent Specification Nos. 2,727,881, 2,822,348 and 3,075,952 and (in combination with phosphorus-containing stabilizers) in East German Patent Specification No. 45,278.

Soluble antimony compounds which possess a good catalytic activity for the polycondensation reaction have the disadvantage that, under the reaction conditions, they are relatively easily reduced to metallic antimony and as a result give rise to a greyish-tinged discoloration of the polycondensate to a greater or lesser extent. According to investigations carried out by H. Zimmerman (Faserforschung and Textiltechnik 13, No. 11 (1962), 481–90), soluble titanium compounds are clearly superior to comparable antimony compounds in respect of their catalytic activity. However, they have the disadvantage that they produce a yellow-brown discoloration of the polycondensates, in particular ticular polyethylene terphthalates, if the reaction time is not kept exceptionally short (which in the case of discontinuous processes meets with considerable difficulties for reasons of apparatus) or if the catalyst concentration is not set so low that the desired degree of polycondensation cannot be achieved in times which can be tolerated industrially.

After the end of reaction step A, stabilizers are generally added to the reaction mixture and these are intended to serve to inhibit the catalysts necessary for reaction step A and to increase the stability of the end product. Such inhibitors have been described by H. Ludewig, Polyesterfasern (Polyester fibers), 2nd edition, Akademie-Verlag, Berlin 1974, in U.S. Patent Specification No. 3,028,366 and in German Offenlegungsschriften (German Published Specifications) 1,644,977 and 1,544,986. Examples of such inhibiting compounds which may be mentioned are phosphoric acid and phosphorous acid and their esters, such as trinonylphenyl phosphate or triphenyl phosphate or triphenyl phosphite. Hitherto, it has not been possible to obtain high-molecular weight, light colored polyethylene terephthalates with a viscosity of > 0.7 dl/g even with the use of these stabilizers.

SUMMARY OF THE INVENTION

It has now been found, surprisingly, that metaphosphoric acid and its alkali metal salts or alkaline earth metal salts are superior to all of the stabilizers known hitherto.

Furthermore, it has been found, surprisingly, that it is possible, by means of a specific catalyst/stabilizer system, to prepare high-molecular weight and light colored polyethylene terephthalates which possess an intrinsic viscosity (measured at a concentration of 0.5 g/dl in phenol/tetrachloroethane (weight ratio 1:1) at 25° C.) of > 0.7 dl/g and a color value = yellow shade > 6 units ($b_R$ value measured for the crystalline product by the Gardner method).

While all of the known transesterification catalysts, such as, for example, acetates of monovalent and divalent metals, such as zinc, manganese, calcium, cobalt, lead, cadmium, sodium and lithium, can be employed for the transesterification, it is a fact that only the use of titanium tetrabutylate is advisable, according to the invention, for the polycondensation.

The catalyst/stabilizer system titanium tetrabutylate/metaphosphoric acid, or its alkali metal salts or alkaline earth metal salts, is balanced so delicately that even the use of titanium tetraisopropylate in place of titanium tetrabutylate gives products which, although they are also of high molecular weight, are, however, slightly yellow colored.

The present invention provides a process for the preparation of a polyethylene terephthalate comprising polycondensation of terephthalic acid and/or a dialkyl ester thereof, esterified or transesterified, respectively, with ethylene glycol, in the presence of metaphosphoric acid, or an alkali or alkaline earth metal salt thereof, as a stabilizer.

In a preferred aspect, the present invention provides a process for the preparation of high-molecular light colored polyethylene terephthalates which have an intrinsic viscosity of > 0.7 dl/g and a yellow shade (b value) of less than 6 by the esterification of a dicarboxylic acid component and/or dialkyl ester thereof comprising at least about 90 mol % of terephthalic acid and/or a dialkyl ester thereof, with from about 1.05 to 5 mols of a diol component comprising at least about 90 mol % of ethylene glycol, per mol of the dicarboxylic acid component in the presence of an esterification and/or transesterification catalyst at from about 150 to 250° C. until a conversion of greater than about 95% is achieved; and, subsequent polycondensation of the resulting reaction products in the presence of from about $3.10^{-2}$ to $5.10^{-4}$ mol %, relative to the dicarboxylic acid component, of titanium tetrabutylate as a polycondensation catalyst, and from about 0.02 to 2 mol %, relative to the dicarboxylic acid component, of metaphosphoric acid or an alkali or alkaline earth metal salt thereof as a stabilizer, at from about 200 to 270° C. under reduced pressure. If desired up to about 10 mol % of the dicarboxylic acid component can comprise another aromatic, a cycloaliphatic or a saturated aliphatic dicarboxylic acid having from 6 to 12 C atoms, or a dialkyl ester thereof.

Also up to about 10% of the diol component can comprise a saturated aliphatic, cycloaliphatic or aromatic diol having from 3 to 24 C atoms.

The esterification or transesterification is preferably carried out using from about 1.8 to 3.6 mols of the diol component per mol of the dicarboxylic acid component and is most preferably continued until a conversion of greater than about 99% is achieved. Preferably from about $3.10^{-2}$ to $3.10^{-3}$, mol %, relative to the dicarboxylic acid component of the titanium tetrabutylate is used as a polycondensation catalyst, and the polycondensation is preferably carried out at a pressure of less than about 1 mm Hg.

Suitable terephthalic acid dialkyl esters are terephthalic acid esters of primary alcohols having from 1 to 4 C atoms, for example diethyl terephthalate, dipropyl terephthalate, dibutyl terephthalate and preferably dimethyl terephthalate.

DETAILED DESCRIPTION OF THE INVENTION

Other suitable aromatic, cycloaliphatic or saturated aliphatic dicarboxylic acids having from 6 to 12 C atoms are, for example, phthalic acid, isophthalic acid, naphthalene-2,6-dicarboxylic acid, diphenyl-4,4'-dicarboxylic acid, adipic acid, sebacic acid and cyclohexanediacetic acid.

Other saturated aliphatic, cycloaliphatic or aromatic diols having from 3 to 24 C atoms are, for example, propane-1,3-diol, butane-1,4-diol, pentane-1,5-diol, hexane-1,6-diol, 3-methylpentane-2,4-diol; 2-methylpentane-2,4-diol; 2,2,4-trimethylpentane-1,3-diol; 2,2-diethylpropanediol; hexane-2,5-diol; butane-1,3-diol; 2-ethylhexane-1,3-diol; 1,4-di-(β-hydroxy-ethoxy)-benzene; 2,2-bis-(4-hydroxy cyclohexyl)-propane; 2,4-dihydroxy-1,1,3,3-tetramethyl-cyclobutane; 2,2-bis-(4-β-hydroxyethoxyphenyl)-propane and 2,2-bis-(4-β-hydroxypropoxyphenyl)-propane.

The customary transesterification and esterification catalysts include:

1. Lithium, sodium, potassium, calcium, strontium, barium, magnesium, zinc, cadmium, boron, aluminum, manganese and cobalt in the form of the metals or the oxides, hydrides, formates, alcoholates, glycolates or, preferably, acetates;

2. Calcium chloride and bromide and strontium chloride and bromide;

3. Aluminum chloride and aluminum bromide;

4. The succinates, butyrates and adipates, or enolates of a diketone, of zinc, manganese-II, cobalt, magnesium, chromium, iron and cadmium;

5. Tertiary amines;

6. The malonates, adipates, benzoates and the like of calcium and strontium; and 7. Lithium salts of dithiocarbamic acid.

The compounds which are most suitable as catalysts for the esterification or transesterification are boric acid, boric anhydride and borates, but especially the acetates of monovalent and divalent metals, such as zinc, manganese, calcium, cobalt, lead, cadmium and lithium, preferably sodium acetate.

The alkali metal and alkaline earth metal salts of metaphosphoric acid which are preferably used are sodium metaphosphate, potassium metaphosphate, magnesium metaphosphate and calcium metaphosphate.

In order to obtain high-molecular weight, light colored polycondensates, it is essential as far as possible to carry out the transesterification or esterification to a conversion of > 99%. This is achieved by preparing the bis-(ethylene glycol) terephthalic acid ester at about 200° C., combined with a rise in temperature to about 220° C. towards the end of the reaction. The conversion can be followed by nuclear magnetic resonance (NMR) examination of the reaction product. For the same reason, it is advisable not to exceed a polycondensation temperature of about 270° C.

In order to obtain an even higher molecular weight, the polyethylene terephthalates according to the invention can be subject to a solid phase post-condensation reaction. For this, the granulated product is usually subjected to a polycondensation reaction in the solid phase in vacuo at a pressure of less than about 1 mm Hg or in a stream of nitrogen and a temperature which is from about 60 to 5° C. below the melting point of the polycondensate to be subjected to post-condensation.

Customary amounts, preferably from about 0.001 to 0.5% by weight, of stabilizers can be added to the polyethylene terephthalates prepared according to the invention in order to protect them against thermal oxidative degradation. Examples of suitable stabilizers are phenols and phenol derivatives, preferably sterically hindered phenols which contain alkyl substituents having from 1 to 6 C atoms in the two o-positions relative to the phenolic hydroxyl group, amines, preferably secondary arylamines and their derivatives, phosphates and phosphites, preferably the aryl derivatives thereof, quinones, copper salts or organic acids and addition compounds of copper-I halides with phosphites, such as, for example, 4,4'-bis-(2,6-di-tert.-butylphenol), 1,3,5-trimethyl-2,4,6-tris-(3,5-di-tert.-butyl-4-hydroxy-benzyl)-benzene, 4,4'-butylidene-bis-(6-tert.-butyl-m-cresol), 3,5-di-tert.-butyl-4-hydroxy-benzyl-phosphonic acid diethyl ester, N,N'-bis-(β-naphthyl-p-phenylenediamine), N,N'-bis-(1-methyl-heptyl)-p-phenylenediamine, phenyl-β-naphthylamine, 4,4'-bis-(α,α-dimethylbenzyl)-diphenylamine, 1,3,5-tris-(3,5-di-tert.-butyl-4-hydroxyhydrocinnamoyl)-hexahydro-s-triazine, hydroquinone, p-benzoquinone, toluhydroquinone, p-tert.-butylpyrocatechol, chloranil, naphthoquinone, copper naphthenate, copper octoate, Cu-(I)Cl/triphenyl phosphite, Cu(I)Cl/trimethyl phosphite, Cu(I)-Cl/trischloroethyl phosphite, Cu(I)Cl/tripropyl phosphite, p-nitrosodimethylaniline and the compounds mentioned in paragraph 1, page 4.

The rate of crystallization of the polyethylene terephthalates prepared according to the invention can be further increased by the addition of from about 0.01 to 1% by weight, relative to the polyethylene terephthalates, of nucleating agents.

Suitable nucleating agents are the compounds known to those skilled in the art, such as, for example, those described in Kunststoff-Handbuch (Plastics Handbook), volume VIII, "Polyester" ("Polyesters"), Carl Hanser Verlag, Munich, 1973, page 701.

Of course, other auxiliaries and additives, such as, for example, reinforcing materials, dyestuffs, pigments, slip agents and mold release agents, UV-absorbers, flame-proofing additives and the like can also be added, in the customary amounts, to the polyethylene terephthalates prepared according to the invention.

The polyalkylene terephthalates according to the invention are excellent starting materials for the preparation of films and fiber, and preferably for the production of moldings by injection molding.

EXAMPLES

EXAMPLES 1 TO 6

Examples 1 and 2 described polyethylene terephthalates which have an intrinsic viscosity of $\geq 0.7$ dl/g and a $b$ value (= yellow shade) of $< 6$ prepared according to the invention. Examples 3 and 4 are comparison examples and show that the catalyst, and the stabilizer must be balanced in order to obtain polyethylene terephthalates which are light colored and, at the same time, of high-molecular weight. Examples 5 and 6 show the importance of carefully controlling process parameters if optimum molecular weight and color properties are to be achieved.

In order to characterize the polyethylene terephthalates, the intrinsic viscosity (measured at a concentration of 0.5 g/dl in phenol/tetrachloroethane (weight ratio 1:1) at 25° C.) and the $b$ value (= yellow shade; measured for the crystalline product by the Gardner method) were determined.

5,826 g (30 mols) of dimethyl terephthalate are transesterified with 4,104 g (66 mols) of ethylene glycol, with the elimination of methanol, in the presence of 3.3 g of zinc acetate, while stirring and passing nitrogen over the mixture, at 200 to 220° C. When the transesterification has ended, $9.10^{-4}$ to $9.10^{-3}$ mols of a titanium compound and 0.006–0.6 mol of a phosphorus compound, relative to 1 mol of the dicarboxylic acid component in each case, are added. The temperature is then raised to 250° C. in the course of a further hour and, at the same time, a vacuum ($< 1.0$ mm Hg) is applied to the apparatus. Finally, the mixture is stirred at 250–280° C. and under a pressure of less than 0.5 mm Hg until the desired viscosity is reached. The polyester melt is then spun off through a water bath and granulated. The table which follows shows the experimental conditions and results

| Example | Catalyst | Stabilizer | Maximum polycondensation temperature (° C) | Degree of transesterification+ (%) | Yellow shade++ | Intrinsic Viscosity+++ (dl/g) |
|---|---|---|---|---|---|---|
| 1 | Titanium tetrabutylate | Na metaphosphate | 265 | > 99 | 5.4 | 0.98 |
| 2 | Titanium tetrabutylate | Metaphosphoric acid | 265 | > 99 | 5.1 | 0.95 |
| 3 | Titanium tetraisopropylate | Na metaphosphate | 265 | > 99 | 10.3 | 0.86 |
| 4 | Titanium tetrabutylate | Triphenyl phosphate | 265 | > 99 | 8.6 | 0.82 |
| 5 | Titanium tetrabutylate | Na metaphosphate | 280 | > 99 | 12.4 | 1.06 |
| 6 | Titanium tetrabutylate | Na metaphosphate | 265 | 93 | 5.2 | 0.68 |

+determined by analysis for OCH$_3$ terminal groups by NMR.
++for the crystalline product by the Gardner method.
+++measured at a concentration of 0.5 g/dl in phenol/tetrachloroethane (weight ratio 1:1) at 25° C.

What is claimed is:

1. A process for the preparation of a high-molecular weight light colored polyethylene terephthalate which has an intrinsic viscosity of greater than about 0.7 dl/g measured at 25° C. in 1:1 phenol tetrachloroethane and a yellow shade $b$ value by the Gardner method of less than about 6 comprising
   A. esterification or transesterification at a temperature of between about 150 and 250° C. in the presence of an appropriate catalyst of
      (1) a dicarboxylic component comprising at least 90 mol % of terephthalic acid and terephthalic acid dialkyl ester, and
      (2) about 1.05 to 5 mols per mol of acid component of a diol component comprising at least 90 mol % of ethyleneglycol, until a conversion of greater than about 95% is achieved, and then
   B. polycondensation at a temperature between about 200° and 270° C. under reduced pressure in the presence of
      (1) about $3 \times 10^{-2}$ to $5 \times 10^{-5}$ mol %, based on mols of said acid component, of titanium tetrabutylate, and
      (2) about 0.02 to 2 mol %, based on mols of said acid component, of metaphosphoric acid or its alkali or alkaline earth metal salts.

2. A process as claimed in claim 1 wherein up to 10% of the dicarboxylic acid component comprises at least one of another aromatic, a cycloaliphatic or a saturated aliphatic dicarboxylic acid having from 6 to 12 carbon atoms.

3. The process of claim 1 wherein up to 10% of the diol component comprises an equimolar amount of a saturated aliphatic, cycloaliphatic or aromatic diol having from 3 to 24 carbon atoms.

4. The process of claim 1 wherein from 1.8 to 3.6 mols of the diol component is used per mol of the dicarboxylic acid component.

5. The process of claim 1 wherein esterification and/or transesterification is continued until a conversion of greater than about 99% is achieved.

6. The process of claim 1 wherein from about $3.10^{-2}$ to $3.10^{-3}$ mol % of titanium tetrabutylate, relative to the dicarboxylic acid component is used.

7. The process of claim 1 wherein polycondensation is carried out at a pressure of less than about 1 mm Hg.

8. The process of claim 1 wherein the dialkyl ester is a terephthalic acid ester of a primary alcohol having from 1 to 4 carbon atoms.

9. The process of claim 1 wherein said esterification and transesterification catalyst is selected from the group consisting of boric acid, boric anhydride, and borates or acetates of a metal selected from zinc, manganese, calcium, cobalt, lead, cadmium, lithium and sodium.

10. The process of claim 1 wherein the metaphosphoric acid salt is sodium, potassium, magnesium or calcium metaphosphate.

11. The process of claim 1 wherein the polyethylene terephthalate produced is subjected to a solid phase postcondensation reaction.

12. A process as claimed in claim 11 wherein the post-condensation reaction is carried out at a pressure below about 1 mm Hg or in a stream of nitrogen and at a temperature of from about 60° to 5° C. below the melting point of said polyethylene terephthalate.

13. A polyethylene terephthalate prepared by the process of claim 1.

14. A polyethylene terephthalate according to claim 13 which contains from about 0.001 to 0.5% by weight of a stabilizer for protection against thermal oxidative degradation.

15. The polyethylene terephthalate of claim 13, which contains from about 0.01 to 1% by weight of a nucleating agent.

16. A film, fiber or injection molding produced from a polyethylene terephthalate of claim 13.

* * * * *